(12) United States Patent
Liu et al.

(10) Patent No.: US 11,926,515 B2
(45) Date of Patent: Mar. 12, 2024

(54) ASSEMBLY AND TEST OPERATION ROBOT FOR SPACE STATION EXPERIMENTAL CABINET

(71) Applicant: SHENYANG INSTITUTE OF AUTOMATION, CHINESE ACADEMY OF SCIENCES, Liaoning (CN)

(72) Inventors: Jinguo Liu, Liaoning (CN); Yuanzheng Tian, Liaoning (CN); Zhenxin Li, Liaoning (CN); Hongye Han, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 919 days.

(21) Appl. No.: 16/960,301

(22) PCT Filed: Dec. 19, 2018

(86) PCT No.: PCT/CN2018/121990
§ 371 (c)(1),
(2) Date: Jul. 6, 2020

(87) PCT Pub. No.: WO2019/134511
PCT Pub. Date: Jul. 11, 2019

(65) Prior Publication Data
US 2020/0339399 A1 Oct. 29, 2020

(30) Foreign Application Priority Data
Jan. 4, 2018 (CN) .......................... 201810007243.6

(51) Int. Cl.
*B66F 9/12* (2006.01)
*B65D 19/00* (2006.01)

(52) U.S. Cl.
CPC .......... *B66F 9/125* (2013.01); *B65D 19/0097* (2013.01); *B65D 2519/00298* (2013.01);
(Continued)

(58) Field of Classification Search
CPC ..................... B66F 9/183; B66F 9/125; B65D 2519/00298; B65D 2519/00338;
(Continued)

(56) References Cited

U.S. PATENT DOCUMENTS 5,570,992 A * 11/1996 Lemelson .............. G05B 19/14
901/41
7,780,397 B1 * 8/2010 Binford ................. B66C 23/605
414/803

FOREIGN PATENT DOCUMENTS

CN 201694797 U 1/2011
CN 102414101 A 4/2012
(Continued)

*Primary Examiner* — Glenn F Myers
(74) *Attorney, Agent, or Firm* — NKL Law; Allen Xue

(57) ABSTRACT

The present invention relates to ground support equipment for aerospace engineering, and particularly relates to an assembly and test operation robot for a space station experimental cabinet. The assembly and test operation robot comprises a mobile lifting platform, a comprehensive monitoring system, a rotating clamping mechanism, a multifunctional adapter and a science experimental cabinetet, wherein the mobile lifting platform is used for regulating the horizontal position and the height position of the science experimental cabinetet to realize assembly and transportation functions of the experimental cabinet; the rotating clamping mechanism is installed on the mobile lifting platform to realize clamping and rotation functions of the science experimental cabinet; the multifunctional adapter is installed on the rotating clamping mechanism to carry the science experimental cabinet; and the comprehensive monitoring system is used to monitor the assembly state of the science (Continued)

experimental cabinet in real time. The present invention realizes integrated operation functions of transportation, flipping, assembly and parking in the ground assembly and test process of the space station experimental cabinet, so as to achieve the purpose of safe, efficient and accurate assembly and test of the space station experimental cabinet.

16 Claims, 5 Drawing Sheets

(52) U.S. Cl.
CPC .............. *B65D 2519/00338* (2013.01); *B65D 2519/00815* (2013.01)

(58) Field of Classification Search
CPC ........... B65D 2519/00815; B65D 2519/00293; B65D 2519/00323; B65D 2519/00024; B65D 2519/00273; B65D 2519/00308; B65D 2519/00562; B65D 2519/00059; B65D 19/0097; B25J 19/021; B25J 19/023; B25J 9/1697; B25J 9/1687; B64G 4/00; B64G 2004/005

See application file for complete search history.

(56) References Cited

FOREIGN PATENT DOCUMENTS

| | | |
|---|---|---|
| CN | 102745386 A | 10/2012 |
| CN | 202825844 U | 3/2013 |
| CN | 203133242 U | 8/2013 |
| CN | 103601115 A | 2/2014 |
| CN | 203715198 U | 7/2014 |
| CN | 205187767 U | 4/2016 |
| CN | 106272415 A | 1/2017 |
| CN | 107215819 A | 9/2017 |
| CN | 108248899 A | 7/2018 |
| WO | 2015195165 A1 | 12/2015 |

\* cited by examiner

ASSEMBLY AND TEST OPERATION ROBOT FOR SPACE STATION EXPERIMENTAL CABINET

TECHNICAL FIELD

The present invention relates to ground support equipment for aerospace engineering, and particularly relates to an assembly and test operation robot for a space station experimental cabinet.

BACKGROUND

China is steadily advancing the construction of a manned space station. The main purpose of the space station is to provide a space science laboratory which can be operated for a long time on orbit. As main experimental equipment, a space science experimental cabinet provides standard mechanical, electrical, thermal and environmental interfaces for experimental loads, which is convenient for unified control and management of experimental projects.

In the development process of the science experimental cabinet, frequent disassembly, assembly and test jobs are needed in different places. Meanwhile, the experimental cabinet has a large external size and heavy weight, and the experimental cabinet has the characteristics of various structural states, changeable center of mass, and fewer operable interfaces. These have brought great challenge to the transportation, assembly, flipping, parking and other operations of the experimental cabinet during the ground assembly and test. In the process of the traditional ground assembly and test, casters or transport vehicles are used for transportation, crane lifting, manual or double-crane flipping. The entire operation process is cumbersome, the technology is complicated, and the supporting tooling and operating personnel are occupied largely. In this way, not only the operation efficiency very low, but also the assembly accuracy is poor and the reliability is low. At the same time, the operation process also has great potential safety hazards. Therefore, an assembly and test integration device is urgently needed to satisfy the operation needs of safety, reliability and high efficiency in the ground assembly and test process of the space station experimental cabinet.

SUMMARY

In view of the above problems, the purpose of the present invention is to provide an assembly and test operation robot for a space station experimental cabinet to realize integrated operation functions of transportation, flipping, assembly and parking in the ground assembly and test process of the space station experimental cabinet, so as to achieve the purpose of safe, efficient and accurate assembly and test of the space station experimental cabinet.

To achieve the above purpose, the present invention adopts the following technical solution:

An assembly and test operation robot for a space station experimental cabinet comprises a mobile lifting platform, a comprehensive monitoring system, a rotating clamping mechanism, a multifunctional adapter and a science experimental cabinetet, wherein the mobile lifting platform is used for regulating the horizontal position and the height position of the science experimental cabinetet to realize assembly and transportation functions of the experimental cabinet; the rotating clamping mechanism is installed on the mobile lifting platform to realize clamping and rotation functions of the science experimental cabinet; the multifunctional adapter is installed on the rotating clamping mechanism to carry the science experimental cabinet; and the comprehensive monitoring system is used to monitor the assembly state of the science experimental cabinet in real time.

The mobile lifting platform comprises a waling mechanism and a lifting mechanism, wherein the lifting mechanism is arranged on the front end of the waling mechanism, and the rotating clamping mechanism is arranged on the lifting mechanism.

The lifting mechanism comprises a lifting support frame, a chain transmission mechanism and a wire rope transmission mechanism, wherein the lifting support frame is connected with the waling mechanism; the lifting support frame is provided with a vertical orbit; the rotating clamping mechanism is in sliding connection with the vertical orbit; the chain transmission mechanism and the wire rope transmission mechanism are respectively arranged on the lower end and the upper end of the lifting support frame; the wire rope transmission mechanism and the chain transmission mechanism are connected with the rotating clamping mechanism; the chain transmission mechanism is used for driving winding and releasing of a wire rope in the wire rope transmission mechanism; and the wire rope transmission mechanism is used for driving the lifting of the rotating clamping mechanism.

The rotating clamping mechanism comprises a fixed substrate, a rotating mechanism, a rotating substrate, a clamping mechanism and carrying forks, wherein the fixed substrate is connected with the mobile lifting platform; the rotating mechanism is arranged on the fixed substrate; the rotating substrate is connected with the rotating mechanism; the clamping mechanism is arranged on the rotating substrate and is connected with two carrying forks; and the two carrying forks are opened or closed by the driving of the clamping mechanism.

The clamping mechanism comprises two hydraulic cylinders installed on the rotating substrate along a horizontal direction, and levers of the two hydraulic cylinders are respectively connected with the two carrying forks, and have opposite output directions.

The rotating clamping mechanism also comprises a protective cover arranged outside the clamping mechanism.

The comprehensive monitoring system comprises an upper camera, a proximity switch a, an angle sensor, a proximity switch b, a distance sensor, a lower camera, a height sensor, a display screen and a control system, wherein the upper camera and the lower camera are arranged on the top and the bottom of the mobile lifting platform for monitoring the assembly angle and position of the science experimental cabinet; the proximity switch a and the proximity switch b are respectively arranged in a position of 0° and a position of 90° on the rotating clamping mechanism; the distance sensor, the height sensor and the angle sensor are used for monitoring the walking, lifting and rotating states in real time; The display screen and the control system are arranged on the mobile lifting platform; and the control system is used for processing the feedback parameter of each sensor and issuing control commands; and the display screen can be used for setting control parameters, displaying various motion state parameters and process videos in real time, and realizing limiting alarm and prompt functions.

The multifunctional adapter is of a "#"-shaped frame structure; and the "#"-shaped frame structure is provided with a plurality of interfaces for assembling the science experimental cabinet and a plurality of slots inserted with the rotating clamping mechanism.

The slots in the "#"-shaped frame structure comprise front flipping slots and side flipping slots which are vertically arranged.

A front surface of the "#"-shaped frame structure is provided with an experimental cabinet switching interface, and a back surface is provided with a tooling switching interface and a parking support interface.

The present invention has the following advantages and beneficial effects:

1. More comprehensive functions: the present invention can complete multiple operation procedures such as transportation, assembly, flipping and parking of the experimental cabinet, and integrates multiple functions into a whole, and the device has comprehensive functions and high integration degree.

2. Safer operation: the present invention is provided with a walking sensor, a lifting sensor and a rotating sensor which can measure the motion states in real time and feed back state parameters. The control system can also conduct limiting and alarming operation, and can alarm and cut off the operation. Meanwhile, a video monitoring system is arranged, which can monitor the real-time operation process and ensure safety and reliability of the operation.

3. More efficient work: the present invention can complete different operation procedures in multiple operation processes through a limited number of operations by one device, thereby greatly reducing the use frequency of personnel and tooling and obviously increasing working efficiency.

4. More accurate operation: the present invention can feed back the rotation angle, the lifting height and the moving displacement in real time through the real-time parameter feedback of the control system and auxiliary video monitoring, which is convenient for guiding operators to conduct accurate operation of transportation, flipping and assembly.

5. More diverse interfaces: the present invention is provided with a #-shaped load switching interface which can adapt to experimental cabinets of different quality and interfaces and serve as a transportation switching structure and a parking support structure.

In the figures: 1 mobile lifting platform; 101 walking mechanism; 102 lifting support frame; 103 chain transmission mechanism; 104 wire rope transmission mechanism;

2 comprehensive monitoring system; 201 upper camera; 202 proximity switch a; 203 angle sensor; 204 proximity switch b; 205 distance sensor; 206 lower camera; 207 height sensor; 208 display screen; 209 control system;

3 rotating clamping mechanism; 301 fixed substrate; 302 rotating mechanism; 303 rotating substrate; 304 clamping mechanism; 305 carrying fork; 306 protective cover;

4 multifunctional adapter; 401 front flipping slot; 402 side flipping slot; 403 experimental cabinet switching interface; 404 tooling switching interface; 405 parking support interface;

5 science experimental cabinet.

DETAILED DESCRIPTION

To make the purpose, the technical solution and the advantages of the present invention more clear, the present invention will be described in detail below in detail in combination with drawings and specific embodiments.

Figure 1:
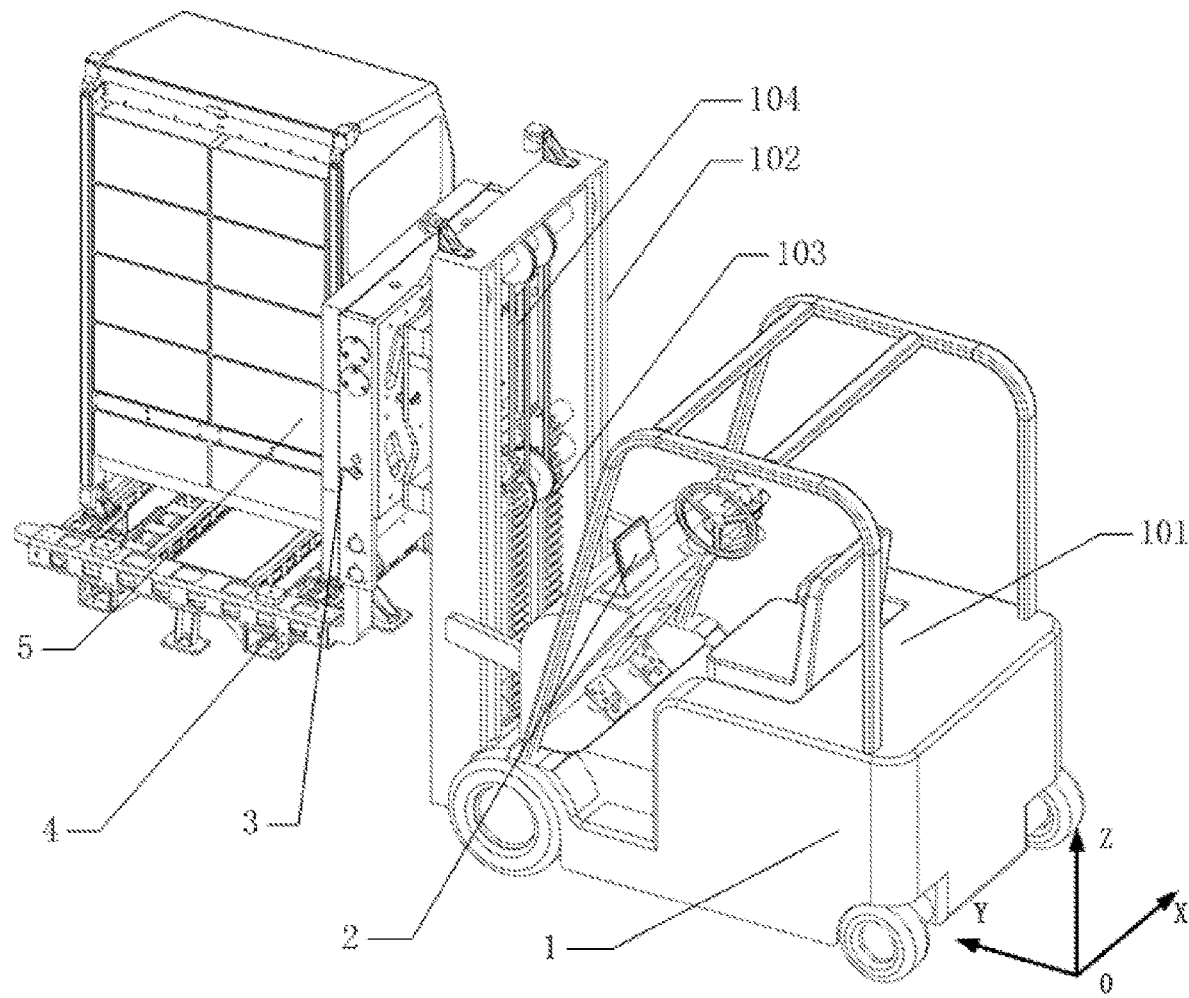
FIG. 1 is a structural schematic diagram of the present invention.

As shown in FIG. 1, an assembly and test operation robot for a space station experimental cabinet provided by the present invention comprises a mobile lifting platform 1, a comprehensive monitoring system 2, a rotating clamping mechanism 3, a multifunctional adapter 4 and a science experimental cabinetet 5, wherein the mobile lifting platform 1 is used for regulating the horizontal position and the height position of the science experimental cabinetet 5 to realize assembly and transportation functions of the experimental cabinet; the rotating clamping mechanism 3 is installed on the mobile lifting platform 1 to realize clamping and rotation functions of the science experimental cabinet 5; the multifunctional adapter 4 is installed on the rotating clamping mechanism 3 to carry the science experimental cabinet 5; and the comprehensive monitoring system 2 is used to monitor the assembly state of the science experimental cabinet 5 in real time.

The mobile lifting platform 1 comprises a waling mechanism 101 and a lifting mechanism, wherein the lifting mechanism is arranged on the front end of the waling mechanism 101, and the rotating clamping mechanism 3 is arranged on the lifting mechanism.

In the embodiment of the present invention, the walking mechanism 101 is a walking vehicle.

The lifting mechanism comprises a lifting support frame 102, a chain transmission mechanism 103 and a wire rope transmission mechanism 104, wherein the lifting support frame 102 is connected with the waling mechanism 101; the lifting support frame 102 is provided with a vertical orbit; the rotating clamping mechanism 3 is in sliding connection with the vertical orbit; the chain transmission mechanism 103 and the wire rope transmission mechanism 104 are respectively arranged on the lower end and the upper end of the lifting support frame 102; the wire rope transmission mechanism 104 and the chain transmission mechanism 103 are connected with the rotating clamping mechanism 3; the chain transmission mechanism 103 is used for driving winding and releasing of a wire rope in the wire rope transmission mechanism 104; and the wire rope transmission mechanism 104 is used for driving the lifting of the rotating clamping mechanism 3.

The wire rope transmission mechanism 104 comprises a fixed upper pulley, a lower pulley and a wire rope; the upper pulley is installed on the top of the lifting support frame 102; the lower pulley is arranged in the middle of the lifting support frame 102 and is in transmission connection with the chain transmission mechanism 103; one end of the wire rope is wound on the lower pulley, and the other end is connected with the rotating clamping mechanism 3 through the upper pulley.

The mobile lifting platform 1 mainly provides four freedoms of motion such as motion in XY plane, rotation around Z axis and slide along Z axis, and can realize the functions of arbitrary position and angle adjustment of the platform in the plane, and the position adjustment in the vertical direction, so as to satisfy the transportation, assembly and lifting needs for the experimental cabinet.

Figure 3:
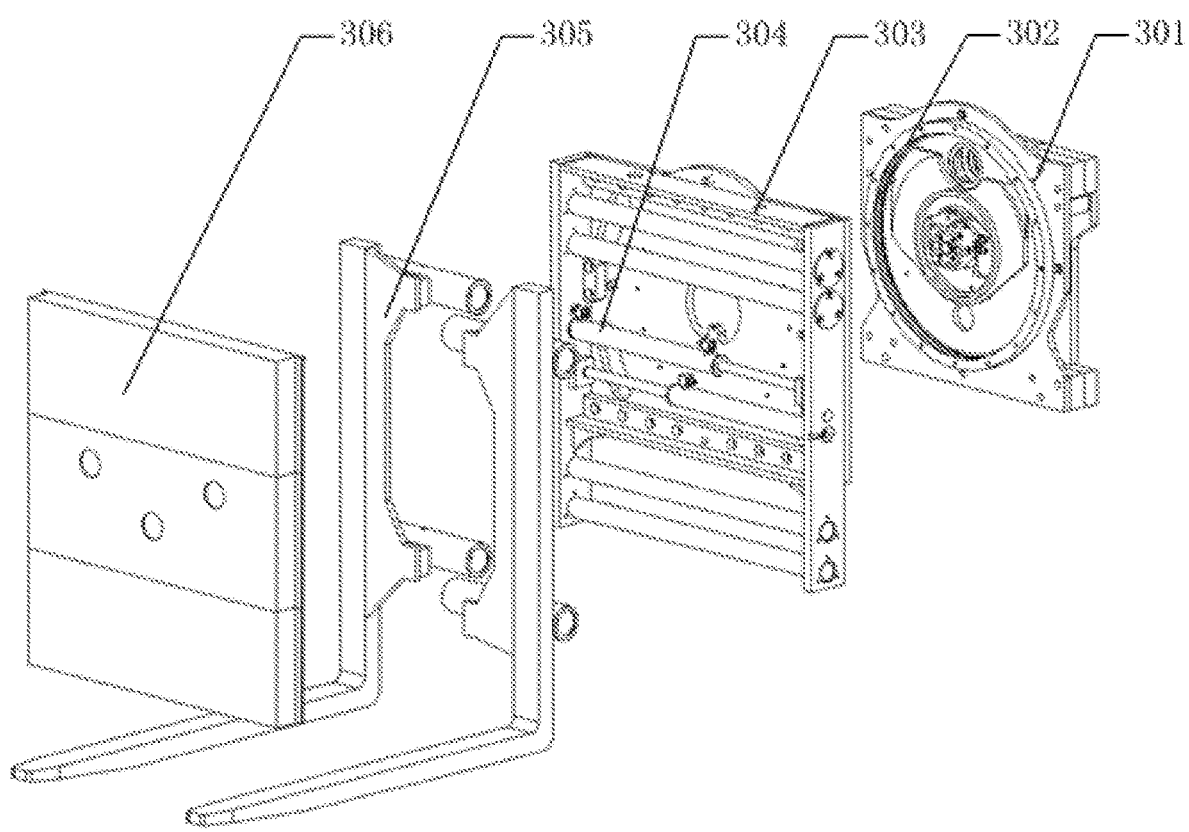
FIG. 3 is a structural schematic diagram of a rotating clamping mechanism in the present invention.

As shown in FIG. 3, the rotating clamping mechanism 3 comprises a fixed substrate 301, a rotating mechanism 302, a rotating substrate 303, a clamping mechanism 304 and carrying forks 305, wherein the fixed substrate 301 is connected with the mobile lifting platform 1; the rotating mechanism is arranged on the fixed substrate 301; the rotating substrate 303 is connected with the rotating mechanism; the clamping mechanism 304 is arranged on the rotating substrate 303 and is connected with two carrying forks 305; and the two carrying forks 305 are opened or closed by the driving of the clamping mechanism 304.

The rotating clamping mechanism 3 also comprises a protective cover 306 arranged outside the clamping mechanism 304.

The clamping mechanism 304 comprises two hydraulic cylinders installed on the rotating substrate 303 along a horizontal direction, and levers of the two hydraulic cylinders are respectively connected with the two carrying forks 305, and have opposite output directions. The two carrying forks 305 are driven by the two hydraulic cylinders and opened or closed.

The rotating mechanism 302 adopts a hydraulic motor to drive a speed reducer, and then drives a rotating support structure for rotating support to rotate through gear transmission. The rotating support structure for rotating support is connected with the rotating substrate 303. The rotating substrate 303 provides a frame structure for installing the clamping mechanism 304. The clamping mechanism 304 adopts hydraulic telescopic cylinders; the two carrying forks are respectively connected at the end parts; and the opening and clamping operations of the carrying forks are realized by hydraulically driving telescopic rods to move. The rotating clamping mechanism can realize 360-degree rotation and opening and clamping functions with a certain spacing. The rotation and clamping operations are realized by different hydraulic circuits, and independent motion control can be performed.

The rotating clamping mechanism 3 mainly provides two freedoms of motion such as rotation around Y axis and slide along X axis, and can realize the operation that the mechanism rotates by 360° around Y axis and the carrying forks are opened and clamped along X axis, so as to satisfy the flipping and clamping operation needs for the experimental cabinet.

Figure 2:
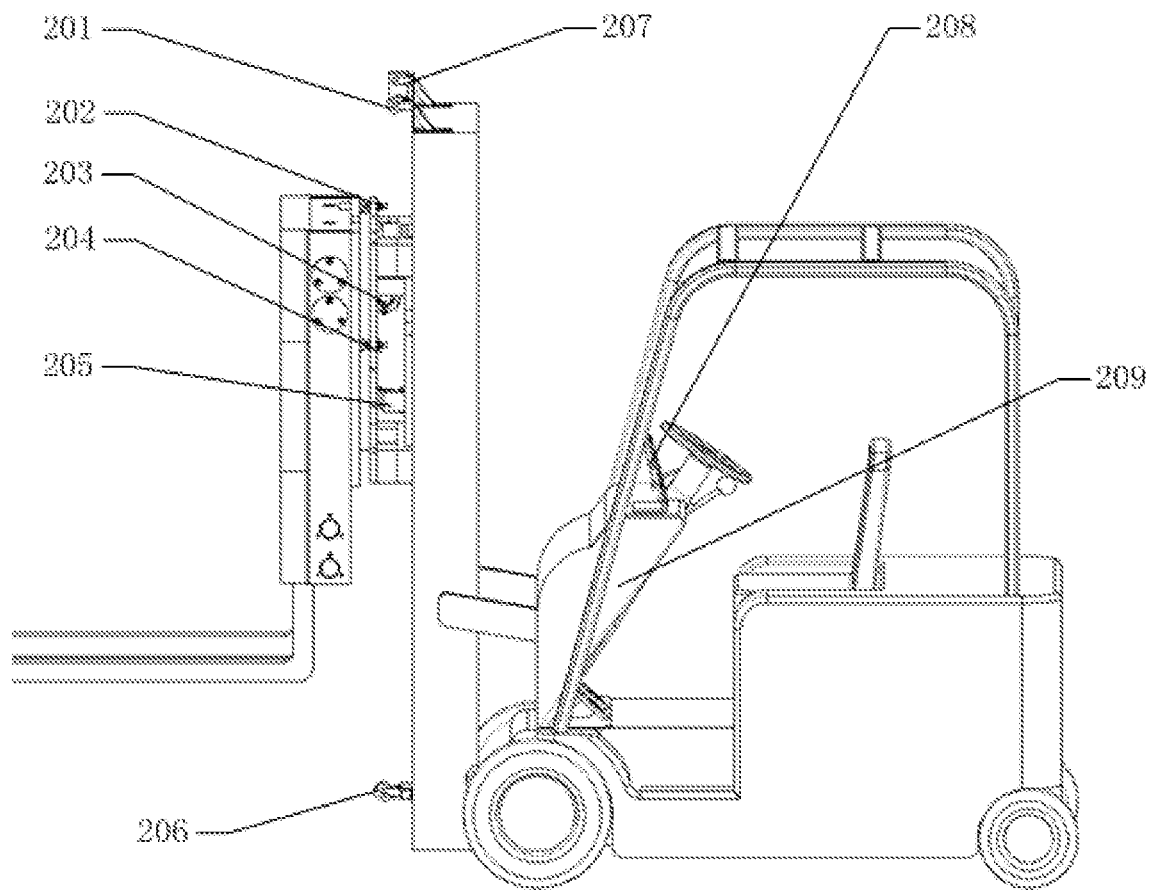
FIG. 2 is a distribution diagram of a comprehensive monitoring system in the present invention.

As shown in FIG. 2, the comprehensive monitoring system 2 comprises an upper camera 201, a proximity switch a202, an angle sensor 203, a proximity switch b204, a distance sensor 205, a lower camera 206, a height sensor 207, a display screen 208 and a control system 209, wherein the upper camera 201 and the lower camera 206 are arranged on the top and the bottom of the mobile lifting platform 1 for monitoring the assembly angle and position of the science experimental cabinet 5; the proximity switch a202 and the proximity switch b204 are respectively arranged in a position of 0° and a position of 90° on the rotating clamping mechanism 3; the distance sensor 205, the height sensor 207 and the angle sensor 203 are used for monitoring the walking, lifting and rotating states in real time; the display screen 208 and the control system 209 are arranged on the mobile lifting platform 1; the control system 209 is used for processing the feedback parameter of each sensor and issuing control commands; and the display screen 208 can be used for setting control parameters, displaying various motion state parameters and process videos in real time, and realizing limiting alarm and prompt functions.

The working principle of the comprehensive monitoring system 2 is as follows:

(1) The distance sensor 205 is arranged in a walking direction; the height sensor 207 is arranged in a lifting direction; and the angle sensor 203 is arranged on a rotating motor of the rotating clamping mechanism for monitoring the walking, lifting and rotating states in real time.

(2) In order to ensure the reliability and the safety of the operation process and make the operation process controllable, the upper camera 201 and the lower camera 206 are respectively arranged on the top and the bottom of the lifting mechanism for observing the insertion angle and position at different viewing angles and displaying an operation picture in real time through the display screen 208.

(3) In order to ensure the operation accuracy, the proximity switch a202 and the proximity switch b204 are respectively arranged in the positions of 0° and 90° on the rotating mechanism 302 to ensure the accuracy of the rotation angle.

(4) The control system 209 and the display screen 208 are arranged at the front of a cab of the walking vehicle. The control system 209 can process the feedback parameters of each device and issue control commands. The display screen 208 can be used for setting the control parameters, also displaying various motion state parameters and process videos in real time, and realizing limiting alarm and prompt functions.

The comprehensive monitoring system 2 mainly provides a man-machine operation interface, a motion control interface, a video monitoring interface and a limiting alarm function, to achieve the purposes of controllable operation motion, real-time display of the motion states, and safe and reliable operation process.

Figure 4:
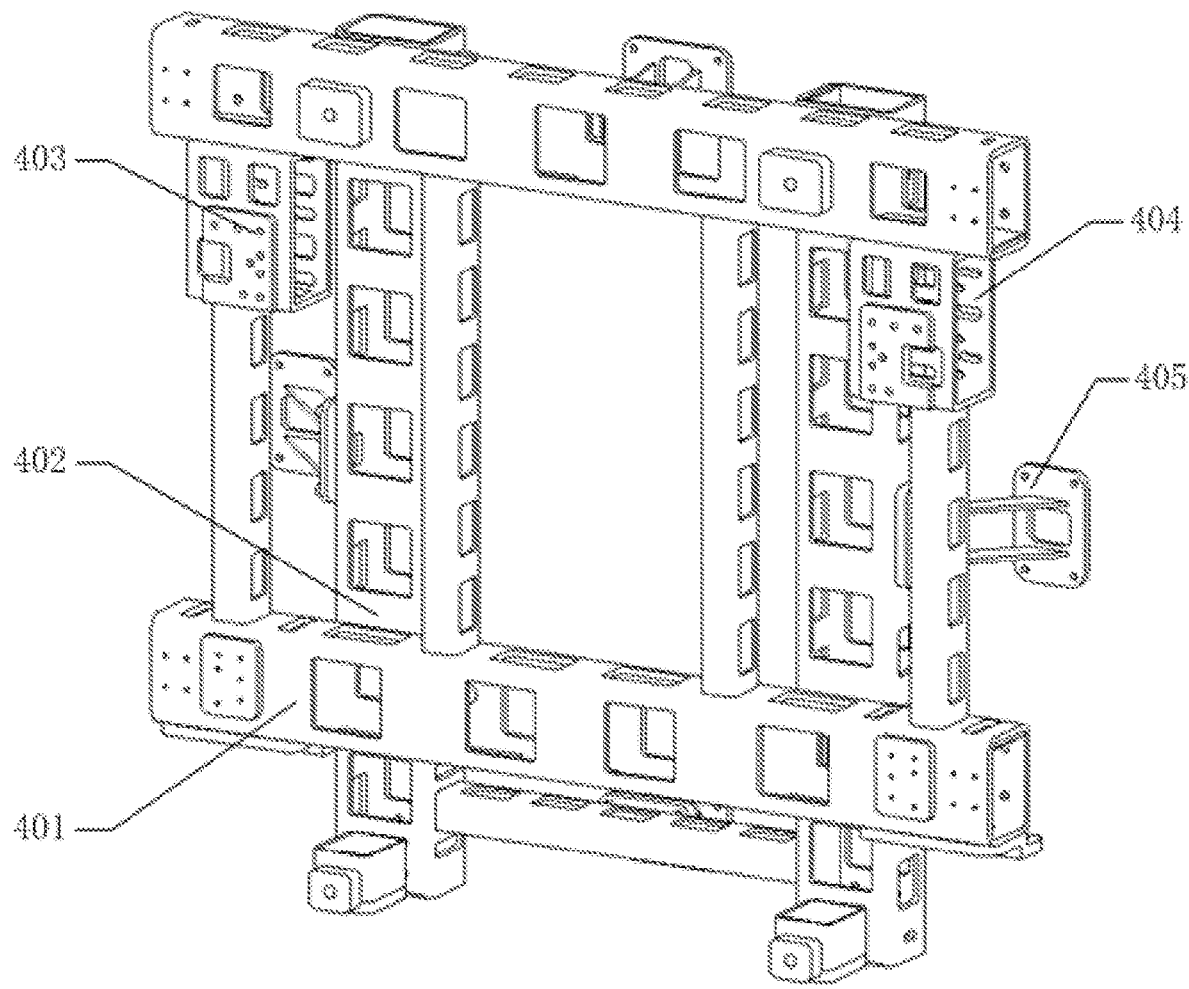
FIG. 4 is a structural schematic diagram of a multifunctional adapter in the present invention.

As shown in FIG. 4, the multifunctional adapter 4 is of a "#"-shaped frame structure; and the "#"-shaped frame structure is provided with a plurality of interfaces for assembling the science experimental cabinet 5 and a plurality of slots inserted with the rotating clamping mechanism 3.

Further, the slots in the "#"-shaped frame structure comprise front flipping slots 401 and side flipping slots 402 which are vertically arranged. A front surface of the "#"-shaped frame structure is provided with an experimental cabinet switching interface 403, and a back surface is provided with a tooling switching interface 404 and a parking support interface 405.

The multifunctional adapter 4 integrates multiple functions into a whole, and can provide a load installation interface, an assembly switching interface, a test interface, a tooling operation interface and a parking interface. A frame body is welded to ensure the structural strength requirements. The installation interface is designed as a double-layer parallel slot structure which comprises the front flipping slots and the side flipping slots, so as to satisfy the operation requirements of two rotation directions of front flipping and side flipping. The installation interface of the experimental cabinet is designed on the front surface of the frame, and a transportation tooling switching interface and a parking support interface are respectively designed on the back surface of the frame.

The multifunctional adapter 4 mainly provides various interfaces such as the installation interface of the experimental cabinet, the assembly switching interface, front flipping and side flipping operation interfaces, the parking interface, and the like, to satisfy different operation function needs of the experimental cabinet.

The science experimental cabinet 5 has four posture states including supine, vertical, prone and recumbent posture states, and three quality states including full load, half load and no load. The tooling needs to complete the movement and short-distance transportation work among experimental cabinet stations under different quality states, complete the flipping operation among different posture states, complete the assembly and disassembly work of the experimental cabinet on the transportation tooling and a test bench, and complete parking work under multiple states.

Figure 5:
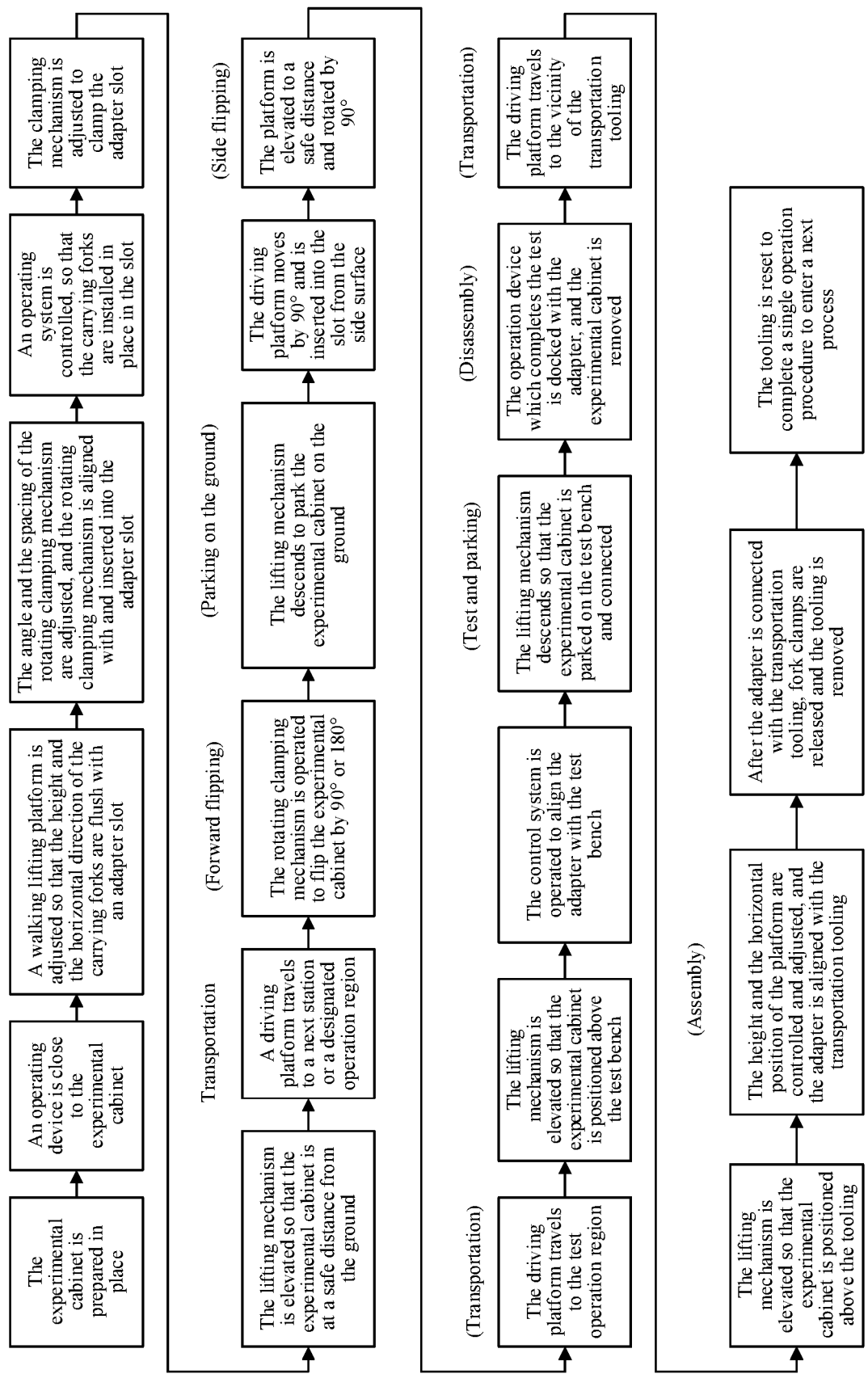
FIG. 5 is an operation flow chart of the present invention.

As shown in FIG. 5, the specific operation process of the present invention is as follows:

The experimental cabinet is prepared in place; an operating device is close to the experimental cabinet; a walking lifting platform is adjusted so that the height and the horizontal direction of the carrying forks are flush with an adapter slot; the angle and the spacing of the rotating clamping mechanism are adjusted; the rotating clamping mechanism is aligned with and inserted into the adapter slot; an operating system is controlled, so that the carrying forks are installed in place in the slot; the clamping mechanism is adjusted to clamp the adapter slot; the lifting mechanism is elevated so that the experimental cabinet is at a safe distance from the ground; a driving platform travels to a next station or a designated operation region; the rotating clamping mechanism is operated to flip the experimental cabinet by 90° or 180°; the lifting mechanism descends to park the experimental cabinet on the ground; the driving platform moves by 90° and is inserted into the slot from the side surface; the platform is elevated to a safe distance and rotated by 90°; the driving platform travels to the test operation region; the lifting mechanism is elevated so that the experimental cabinet is positioned above the test bench; the control system is operated to align the adapter with the test bench; the lifting mechanism descends so that the experimental cabinet is parked on the test bench and connected; the operation device which completes the test is docked with the adapter, and the experimental cabinet is removed; the driving platform travels to the vicinity of the transportation tooling; the lifting mechanism is elevated so that the experimental cabinet is positioned above the tooling; the height and the horizontal position of the platform are controlled and adjusted; the adapter is aligned with the transportation tooling; and after the adapter is connected with the transportation tooling, fork clamps are released, the tooling is removed and the tooling is reset to complete a single operation procedure to enter a next process.

The assembly and test operation robot for the space station experimental cabinet proposed by the present invention is applied to the field of ground assembly and test of the space station experimental cabinet for the first time. An integrated assembly and test device is innovatively designed, which not only solves the problems of low safety, poor reliability and low accuracy in traditional ground assembly and test, but also provides an integrated multi-procedure operation mode, thereby greatly increasing the assembly and test efficiency, reducing the occupation rate of tooling equipment and personnel and greatly reducing the test cost. Therefore, the present invention has strong competitiveness in the ground assembly and test of the space station experimental cabinet, and conforms to the novelty, the inventiveness ad the practicality required by the patent invention.

The above only describes the embodiments of the present invention and is not intended to limit the protection scope of the present invention. Any modification, equivalent replacement, improvement, expansion, etc. made within the spirit and the principle of the present invention shall be included within the protection scope of the present invention.

The invention claimed is:

1. An assembly and test operation robot for a space station experimental cabinet, comprising a mobile lifting platform (1), a comprehensive monitoring system (2), a rotating clamping mechanism (3), a multifunctional adapter (4) and a science experimental cabinet (5), wherein:
   the mobile lifting platform (1) is used for regulating a horizontal position and a height position of the science experimental cabinet (5) to realize assembly and transportation functions of the experimental cabinet;
   the rotating clamping mechanism (3) is installed on the mobile lifting platform (1) to realize clamping and rotation functions of the science experimental cabinet (5);
   the multifunctional adapter (4) is installed on the rotating clamping mechanism (3) to carry the science experimental cabinet (5);
   the comprehensive monitoring system (2) is used to monitor an assembly state of the science experimental cabinet (5) in real time,
   wherein the mobile lifting platform (1) comprises a waling mechanism (101) and a lifting mechanism,
   wherein the lifting mechanism is arranged on a front end of the waling mechanism (101), and the rotating clamping mechanism (3) is arranged on the lifting mechanism,
   wherein the lifting mechanism comprises a lifting support frame (102), a chain transmission mechanism (103) and a wire rope transmission mechanism (104), wherein the lifting support frame (102) is connected with the waling mechanism (101); the lifting support frame (102) is provided with a vertical orbit; the rotating clamping mechanism (3) is in sliding connection with the vertical orbit; the chain transmission mechanism (103) and the wire rope transmission mechanism (104) are respectively arranged on a lower end and an upper end of the lifting support frame (102); the wire rope transmission mechanism (104) and the chain transmission mechanism (103) are connected with the rotating clamping mechanism (3); the chain transmission mechanism (103) is used for driving winding and releasing of a wire rope in the wire rope transmission mechanism (104); and the wire rope transmission mechanism (104) is used for lifting the rotating clamping mechanism (3).

2. The assembly and test operation robot for the space station experimental cabinet according to claim 1, wherein the rotating clamping mechanism (3) comprises a fixed substrate (301), a rotating mechanism (302), a rotating substrate (303), a clamping mechanism (304) and carrying forks (305), wherein the fixed substrate (301) is connected with the mobile lifting platform (1); the rotating mechanism is arranged on the fixed substrate (301); the rotating substrate (303) is connected with the rotating mechanism; the clamping mechanism (304) is arranged on the rotating substrate (303) and is connected with two carrying forks (305); and the two carrying forks (305) are opened or closed driven by the clamping mechanism (304).

3. The assembly and test operation robot for the space station experimental cabinet according to claim 2, wherein the clamping mechanism (304) comprises two hydraulic cylinders installed on the rotating substrate (303) along a horizontal direction, and levers of the two hydraulic cylinders are respectively connected with the two carrying forks (305), and have opposite output directions.

4. The assembly and test operation robot for the space station experimental cabinet according to claim 2, wherein the rotating clamping mechanism (3) further comprises a protective cover (306) arranged outside the clamping mechanism (304).

5. An assembly and test operation robot for a space station experimental cabinet, comprising a mobile lifting platform (1), a comprehensive monitoring system (2), a rotating clamping mechanism (3), a multifunctional adapter (4) and a science experimental cabinet (5), wherein the mobile lifting platform (1) is used for regulating a horizontal position and a height position of the science experimental cabinet (5) to realize assembly and transportation functions of the experimental cabinet;

the rotating clamping mechanism (3) is installed on the mobile lifting platform (1) to realize clamping and rotation functions of the science experimental cabinet (5);

the multifunctional adapter (4) is installed on the rotating clamping mechanism (3) to carry the science experimental cabinet (5); and the comprehensive monitoring system (2) is used to monitor an assembly state of the science experimental cabinet (5) in real time, wherein the comprehensive monitoring system (2) comprises an upper camera (201), a proximity switch a (202), an angle sensor (203), a proximity switch b (204), a distance sensor (205), a lower camera (206), a height sensor (207), a display screen (208) and a control system (209), wherein the upper camera (201) and the lower camera (206) are arranged on the top and the bottom of the mobile lifting platform (1) for monitoring the assembly angle and position of the science experimental cabinet (5); the proximity switch a (202) and the proximity switch b(204) are respectively arranged in a position of 0° and a position of 90° on the rotating clamping mechanism (3); the distance sensor (205), the height sensor (207) and the angle sensor (203) are used for monitoring the walking, lifting and rotating states in real time; the display screen (208) and the control system (209) are arranged on the mobile lifting platform (1); the control system (209) is used for processing the feedback parameter of each sensor and issuing control commands; and the display screen (208) is used for setting control parameters, displaying various motion state parameters and process videos in real time, and realizing limiting alarm and prompt functions.

6. The assembly and test operation robot for the space station experimental cabinet according to claim 1, wherein the multifunctional adapter (4) is a frame having a plurality of interfaces for assembling the science experimental cabinet (5) and a plurality of slots inserted with the rotating clamping mechanism (3).

7. The assembly and test operation robot for the space station experimental cabinet according to claim 6, wherein the slots in the multifunctional adapter (4) include front flipping slots (401) and side flipping slots (402) which are vertically arranged.

8. The assembly and test operation robot for the space station experimental cabinet according to claim 6, wherein a front surface of the frame is provided with an experimental cabinet switching interface (403), and a back surface of the frame is provided with a tooling switching interface (404) and a parking support interface (405).

9. The assembly and test operation robot for the space station experimental cabinet according to claim 5, wherein the mobile lifting platform (1) comprises a waling mechanism (101) and a lifting mechanism, wherein the lifting mechanism is arranged on a front end of the waling mechanism (101), and the rotating clamping mechanism (3) is arranged on the lifting mechanism.

10. The assembly and test operation robot for the space station experimental cabinet according to claim 9, wherein the lifting mechanism comprises a lifting support frame (102), a chain transmission mechanism (103) and a wire rope transmission mechanism (104), wherein the lifting support frame (102) is connected with the waling mechanism (101); the lifting support frame (102) is provided with a vertical orbit; the rotating clamping mechanism (3) is in sliding connection with the vertical orbit; the chain transmission mechanism (103) and the wire rope transmission mechanism (104) are respectively arranged on a lower end and an upper end of the lifting support frame (102); the wire rope transmission mechanism (104) and the chain transmission mechanism (103) are connected with the rotating clamping mechanism (3); the chain transmission mechanism (103) is used for driving winding and releasing of a wire rope in the wire rope transmission mechanism (104); and the wire rope transmission mechanism (104) is used for lifting the rotating clamping mechanism (3).

11. The assembly and test operation robot for the space station experimental cabinet according to claim 5, wherein the rotating clamping mechanism (3) comprises a fixed substrate (301), a rotating mechanism (302), a rotating substrate (303), a clamping mechanism (304) and carrying forks (305), wherein the fixed substrate (301) is connected with the mobile lifting platform (1); the rotating mechanism is arranged on the fixed substrate (301); the rotating substrate (303) is connected with the rotating mechanism; the clamping mechanism (304) is arranged on the rotating substrate (303) and is connected with two carrying forks (305); and the two carrying forks (305) are opened or closed driven by the clamping mechanism (304).

12. The assembly and test operation robot for the space station experimental cabinet according to claim 11, wherein the clamping mechanism (304) comprises two hydraulic cylinders installed on the rotating substrate (303) along a horizontal direction, and levers of the two hydraulic cylinders are respectively connected with the two carrying forks (305), and have opposite output directions.

13. The assembly and test operation robot for the space station experimental cabinet according to claim 11, wherein the rotating clamping mechanism (3) further comprises a protective cover (306) arranged outside the clamping mechanism (304).

14. The assembly and test operation robot for the space station experimental cabinet according to claim 5, wherein the multifunctional adapter (4) is a frame having a plurality of interfaces for assembling the science experimental cabinet (5) and a plurality of slots inserted with the rotating clamping mechanism (3).

15. The assembly and test operation robot for the space station experimental cabinet according to claim 14, wherein the slots in the multifunctional adapter (4) include front flipping slots (401) and side flipping slots (402) which are vertically arranged.

16. The assembly and test operation robot for the space station experimental cabinet according to claim 14, wherein a front surface of the frame is provided with an experimental cabinet switching interface (403), and a back surface of the frame is provided with a tooling switching interface (404) and a parking support interface (405).

* * * * *